Patented Feb. 15, 1938

2,108,142

UNITED STATES PATENT OFFICE 2,108,142

ACID WOOL DYESTUFFS

Heinrich Ritter, Frankfort-on-the-Main-Fechenheim, Germany, assignor to General Aniline Works, Inc., New York, N. Y., a corporation of Delaware No Drawing. Application August 12, 1936, Serial No. 95,623. In Germany August 13, 1935

4 Claims. (Cl. 260—64)

This invention relates to valuable new acid wool dyestuffs, more particularly to those of the general formula:

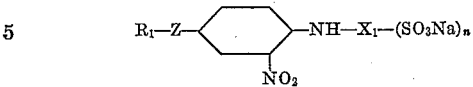

wherein $R_1$ stands for a member selected from the group consisting of alkyl, cycloalkyl, aryl and

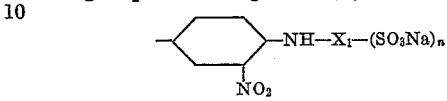

Z stands for a member selected from the group consisting of $SO_2$, $CO$, $SO_2$-aryl-$SO_2$ and $CO$-aryl-$CO$, $n$ stands for the number 1 or 2, $X_1$ stands for a member selected from the group consisting of aryl-NH-aryl, cycloalkyl-NH-aryl. (Aryl meaning in each occurrence of the above significations a radicle selected from the group consisting of the benzene and napthalene series.)

The new dyestuffs are obtained by condensing nitro compounds of the general formula:

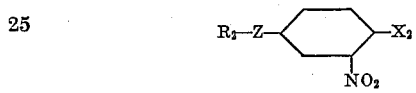

wherein $R_2$ stands for a member selected from the group consisting of alkyl, cycloalkyl, aryl and

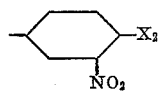

$X_2$ stands for a member selected from the group consisting of halogen and alkoxy, and Z has the above said signification, with compounds of the general formula:

$$H_2N—X_1—(SO_3Na)_n$$

wherein $X_1$ and $n$ have the above said signification. (Aryl meaning in each occurrence of the above configuration a radicle selected from the group consisting of the benzene and naphthalene series.)

The condensation may be carried out by heating the initial materials in the presence of acid-binding agents such as for example sodium acetate, calcium hydroxide, calcium carbonate and the like in an aqueous medium or in an organic diluent with or without the simultaneous addition of water either in an open vessel provided with a reflux condenser or in a closed vessel under pressure.

The new dyestuffs thus obtained dye animal fibers various shades of very good leveling power and fastness properties, partly of an excellent fastness to light, partly of an especially good fastness to washing, ironing, sea water and perspiration.

In order to further illustrate my invention the following examples are given, the parts being by weight and all temperatures in centigrade degrees; but it is, however, to be understood that my invention is not limited to the particular products nor reacting conditions mentioned therein.

Example 1

28.6 parts of the sodium salt of 4-amino-diphenylamine-2-sulfonic acid are dissolved in ten times the quantity of water, 25 parts of 1-chloro-2-nitrobenzene-4-ethylsulfone, about 160 parts of alcohol and 10 parts of sodium acetate are added and the mixture is heated to boiling in an apparatus provided with a reflux condenser for some hours. Then the alcohol is distilled off and the dyestuff formed is separated from the aqueous solution by evaporation or addition of sodium chloride.

The new dyestuff thus obtained of the formula:

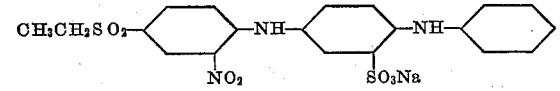

dyes wool from an acid bath yellowish brown shades of very good levelling power and excellent fastness to light.

The same dyestuff is obtained by starting from 1-methoxy-2-nitrobenzene-4-ethylsulfone instead of the 1-chloro-2-nitrobenzene-4-ethylsulfone in the above example.

The corresponding dyestuff prepared according to Patent No. 1,059,571 by starting from 2,4-dinitro-chlorobenzene is considerably surpassed by the new dyestuff as regards levelling power and fastness to light.

By employing 33 parts of the sodium salt of 4'-ethoxy-4-amino-diphenylamine-2-sulfonic acid instead of the sodium salt of 4-amino-diphenylamine-2-sulfonic acid in the above example a similar brown dyestuff of likewise good properties is obtained.

Example 2

28.6 parts of the sodium salt of 4-amino-diphenylamine-2-sulfonic acid are dissolved in ten times the quantity of water, 26.3 parts of 1-chloro-2-nitrobenzene-4-propylsulfone and 10 parts of sodium acetate are added and the mixture is heated to boiling for some hours in an apparatus provided with a reflux condenser.

Then the dyestuff formed is separated from the solution by evaporation or addition of sodium chloride.

The new dyestuff thus obtained of the formula:

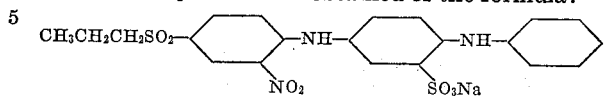

dyes wool brown shades, darker brown than those of the dyestuff obtained according to Example 1, and of likewise good levelling power and fastness to light.

By employing 27.5 parts of 1-chloro-2-nitrobenzene-4-butylsulfone instead of the 1-chloro-2-nitrobenzene-4-propylsulfone in the above example an analogous dyestuff is obtained which dyes wool full brown shades of likewise good fastness properties.

Dyestuffs of similar properties are obtained by replacing the sodium salt of 4-amino-diphenylamine-2-sulfonic acid employed in Examples 1 and 2 for example by the sodium salts of 4-amino-4'-acetylamino-diphenylamine-2-sulfonic acid, 1-amino-4-cyclo-hexylaminobenzene-3-sulfonic acid, 1-amino-4-naphthylamino-benzene-3-sulfonic acid and the like.

Example 3

28.6 parts of the sodium salt of 4-amino-diphenylamine-2-sulfonic acid are dissolved in ten times the quantity of water, 27 parts of 1,6-dichloro-2-nitrobenzene-4-methylsulfone at 149° melting point and 10 parts of sodium acetate are added and the mixture is heated to boiling for some hours in an apparatus provided with a reflux condenser. Then the solution is freed from impurities by filtration and the dyestuff formed is separated from the filtrate by evaporation or addition of sodium chloride.

The new dyestuff thus obtained of the formula:

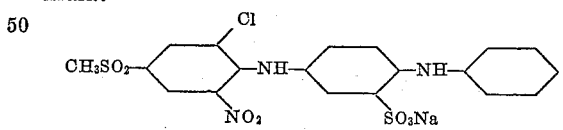

dyes wool from an acid bath yellowish brown shades. By employing the corresponding amounts of the sodium salts of 4'-methoxy-4-amino-diphenylamine-2-sulfonic acid or 4'-ethoxy-4-amino-diphenylamine-2-sulfonic acid

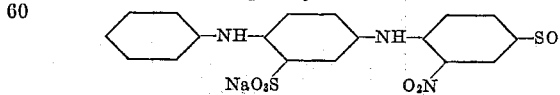

instead of the sodium salt of 4-aminodiphenylamine-2-sulfonic acid in the above example dyestuffs are obtained which dye more reddish brown shades of similar properties.

Example 4

28.6 parts of the sodium salt of 4-amino-diphenylamine-2-sulfonic acid are dissolved in ten times the quantity of water, 18.8 parts of 4,4'-dichloro-3,3'-dinitro-diphenylsulfone, 10 parts of sodium acetate and about 240 parts of alcohol are added and the mixture is heated to boiling for some hours in an apparatus provided with a reflux condenser. Then the alcohol is distilled off, the aqueous solution is filtered and the dyestuff formed is separated from the filtrate by the addition of sodium chloride.

The new dyestuff thus obtained of the formula:

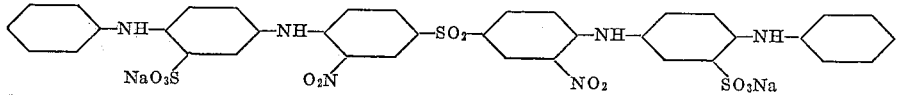

dyes wool from an acid bath yellowish brown shades of excellent fastness properties.

Example 5

31.6 parts of the sodium salt of 4'-methoxy-4-amino-diphenylamine-2-sulfonic acid are condensed in an analogous manner as described in Example 4 with 18.8 parts of 4,4'-dichloro-3,3'-dinitro-diphenylsulfone in the presence of 5 parts of magnesium oxide.

The new dyestuff thus obtained of the formula:

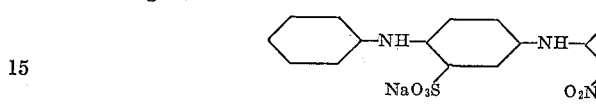

dyes wool from an acid bath brown shades of excellent fastness properties.

An analogous dyestuff is obtained by employing 33 parts of the sodium salt of 4'-ethoxy-4-amino-diphenylamine-2-sulfonic acid instead of the 31.6 parts of the corresponding 4'-methoxy compound in the above example, whereas the dyestuff prepared by employing the corresponding amount of 3'4'-dimethoxy-4-amino-diphenylamine-2-sulfonic acid dyes considerably deeper brown shades.

Example 6

28.6 parts of the sodium salt of 4-amino-diphenylamine-2-sulfonic acid, about twenty times the quantity of a mixture of water and alcohol which mixture contains 50% of alcohol, 28.3 parts of naphthalene-1,5-di-(3'-nitro-4'-chlorophenyl)-sulfone of 306–307° melting point and 10 parts of magnesium oxide are heated to about 140 to 150° for some hours in an autoclave provided with a stirrer. Then the sodium salt is formed by the addition of the corresponding amount of sodium carbonate, the alcohol is distilled off, the aqueous solution is freed from impurities by filtration while hot and the dyestuff formed is separated from the filtrate by evaporation or addition of sodium chloride.

The new dyestuff thus obtained of the formula:

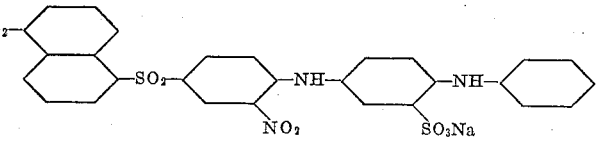

dyes wool from an acid bath brown shades of good fastness properties.

Analogous dyestuffs are obtained by employing instead of the sodium salt of 4-amino-diphenylamine-2-sulfonic acid in the above example the sodium salts of the corresponding 4'-methoxy or 4'-ethoxy compounds or the like.

Example 7

63.2 parts of the sodium salt of 4'-methoxy-4- amino-diphenylamine-2-sulfonic acid, 41 parts of 3,3' - dinitro - 4,4'5' - trichloro-diphenylsulfone, about twenty times the quantity of a mixture of water and alcohol which mixture contains 50% of alcohol, and 20 parts of sodium acetate are heated in an apparatus provided with a reflux condenser or in a closed vessel under pressure, until the formation of the dyestuff is complete. Then the alcohol is distilled off, the aqueous solution is freed from impurities by filtration and the dyestuff formed is separated from the filtrate by evaporation or addition of sodium chloride.

The new dyestuff thus obtained of the formula:

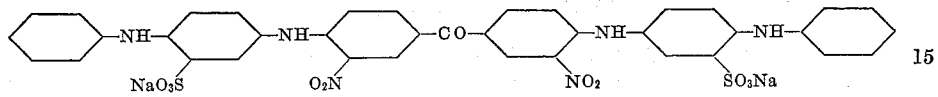

dyes wool from an acid bath yellowish brown shades of good fastness properties.

An analogous dyestuff is obtained by employing instead of the 41 parts of 3,3'-dinitro-4,4'5'-trichloro-diphenylsulfone in the above example the corresponding amount of 3,3'-dinitro-5-methyl-4,4'5'-trichloro-diphenylsulfone.

*Example 8*

28.6 parts of the sodium salt of 4-amino-diphenylamine-2-sulfonic acid are dissolved in ten times the quantity of water, 20 parts of 4-chloro-3-nitro-acetophenone and 10 parts of sodium acetate are added and the mixture is heated to boiling for some hours in an apparatus provided with a reflux condenser. Then the solution is filtered and the dyestuff formed is separated from the filtrate by evaporation or addition of sodium chloride.

The new dyestuff thus obtained of the formula:

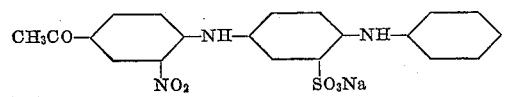

dyes wool from an acid bath yellowish brown shades of very good levelling power and fastness to light.

By employing instead of the 28.6 parts of the sodium salt of 4-amino-diphenylamine-2-sulfonic acid in the above example 33 parts of the sodium salt of 4'-ethoxy-4-amino-diphenylamine-2-sulfonic acid a dyestuff is obtained which dyes wool somewhat more reddish brown shades of likewise good fastness properties.

4-chloro-3-nitro-acetophenone is prepared by nitration of 4-chloro-acetophenone by means of mixed acid in concentrated sulfuric acid at about 0 to 10°. It crystallizes from methylalcohol in colorless crystals of 90 to 91° melting point.

*Example 9*

28.6 parts of the sodium salt of 4-amino-diphenylamine-2-sulfonic acid are dissolved in ten times the quantity of water, 17 parts of 4,4'-dichloro-3,3'-dinitro-benzophenone, 10 parts of sodium acetate and about 160 parts of alcohol are added and the mixture is heated to boiling for some hours in an apparatus provided with a reflux condenser. Then the alcohol is distilled off, the aqueous solution is freed from impurities by filtration and the dyestuff formed is separated from the filtrate by the addition of sodium chloride.

The new dyestuff thus obtained of the formula:

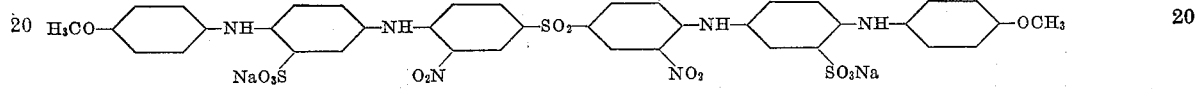

dyes wool from an acid bath yellowish brown shades of good fastness to washing, light and perspiration.

Similar dyestuffs of likewise good fastness properties are obtained by employing 31.6 parts of the sodium salt of 4'-methoxy-4-amino-diphenylamine-2-sulfonic acid or 34.3 parts of the sodium salt of 4'-acetamino-4-amino-diphenylamine-2-sulfonic acid or 34.6 parts of the sodium salt of 3'4'-dimethoxy-4-amino-diphenylamine-2-sulfonic acid instead of the 28.6 parts of the sodium salt of 4-amino-diphenylamine-2-sulfonic acid.

*Example 10*

By condensing 28.6 parts of the sodium salt of 4-amino-diphenylamine-2-sulfonic acid with 21.6 parts of 4,4'-dichloro-3,3',5,5'-tetranitro-benzophenone in the presence of 5 parts of magnesium oxide in an analogous manner as described in Example 9 a dyestuff is obtained of the formula:

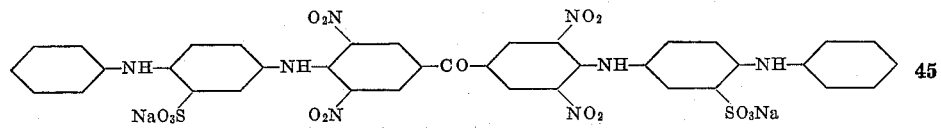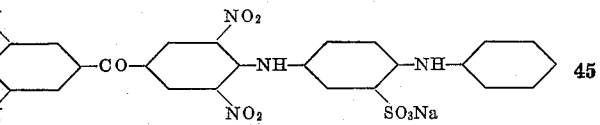

which dyes wool from an acid bath yellowish brown shades of very good fastness to washing and perspiration.

A somewhat more reddish brown dyeing dyestuff is obtained by employing 31.6 parts of the sodium salt of 4'-methoxy-4-amino-diphenylamine-2-sulfonic acid instead of the sodium salt of 4-amino-diphenylamine-2-sulfonic acid in the above example.

*Example 11*

33 parts of the sodium salt of 4'-ethoxy-4-amino-diphenylamine-2-sulfonic acid are dissolved in ten times the quantity of water, 22.3 parts of 1,4-di-(4'-chloro-3'-nitro-benzoyl)-benzene, 10 parts of sodium acetate and about 160 parts of alcohol are added and the mixture is heated to boiling in an apparatus provided with a reflux condenser, until the formation of dyestuff is complete. Then the alcohol is distilled off and the dyestuff formed is separated from the aqueous solution by the addition of a little amount of sodium chloride.

The new dyestuff thus obtained of the formula:

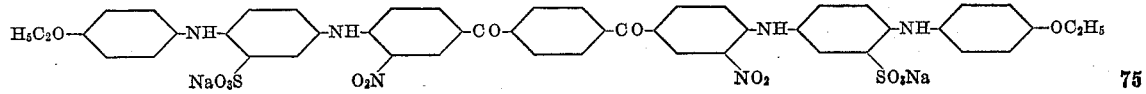

dyes wool from an acid bath yellowish brown shades of good fastness properties.

1,4-di-(4'-chloro-3'-nitro-benzoyl)-benzene is prepared by nitrating by means of mixed acid at about 30 to 40° in monohydrate the condensation product which is obtained according to the method of Friedel-Crafts by acting with terephthaloyl chloride on mono-chlorobenzene. It crystallizes from glacial acetic acid in colorless crystals of 180–187° melting point.

*Example 12*

28.6 parts of the sodium salt of 4-amino-diphenylamine-2-sulfonic acid are dissolved in ten times the quantity of water, 26.8 parts of 1,4-di-(4'-chloro-3'5'-dinitro-benzoyl)-benzene, 10 parts of sodium acetate and about 160 parts of alcohol are added and the mixture is heated to boiling for some hours in an apparatus provided with a reflux condenser. Then the alcohol is distilled off, the aqueous solution is freed from impurities by filtration and the dyestuff formed is separated from the filtrate by the addition of a little amount of sodium chloride.

The new dyestuff thus obtained of the formula:

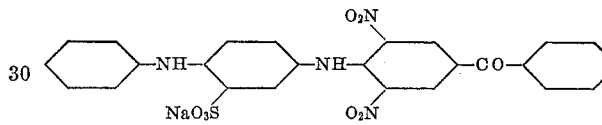

dyes wool from an acid bath yellowish brown shades of very good fastness to washing and perspiration.

By employing instead of the 28.6 parts of the sodium salt of 4-amino-diphenylamine-2-sulfonic acid in the above example the corresponding amount of the sodium salt of 4'-ethoxy-4-amino-diphenylamine-2-sulfonic acid a dyestuff is obtained which dyes wool somewhat more reddish brown shades of likewise good properties.

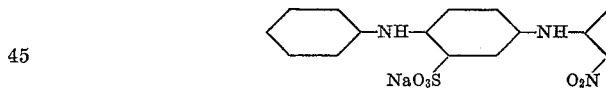

1,4-di-(4'-chloro-3'5'-dinitro-benzoyl)-benzene is prepared by nitrating by means of an excess of mixed acid in fuming sulfuric acid, containing 25% of $SO_3$, at about 110–120° the condensation product which is obtained according to the method of Friedel-Crafts by acting with terephthaloyl-chloride on monochlorobenzene. It crystallizes from monochlorobenzene in colorless crystals of 219 to 220° melting point.

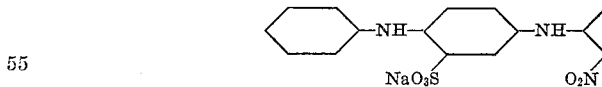

I claim:

1. The acid wool dyestuffs of the general formula:

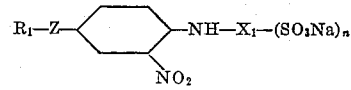

wherein $R_1$ stands for a member selected from the group consisting of alkyl, cycloalkyl, aryl and

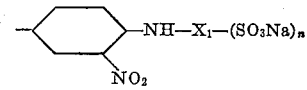

Z stands for a member selected from the group consisting of $SO_2$, $CO$, $SO_2$-aryl-$SO_2$ and $CO$-aryl-$CO$, $n$ stands for the number 1 or 2, $X_1$ stands for a member selected from the group consisting of aryl-NH-aryl, cycloalkyl-NH-aryl (aryl meaning in each occurrence of the above significations a radicle selected from the group consisting of the benzene and naphthalene series), which dyestuffs dye animal fibers various shades of very good levelling power and fastness properties, partly of an excellent fastness to light, partly of an especially good fastness to washing, ironing, sea water and perspiration.

2. The dyestuff of the formula:

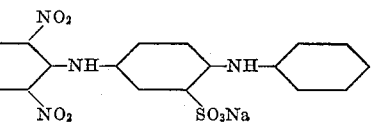

which dyestuff dyes wool from an acid bath brown shades of very good levelling power and excellent fastness to light.

3. The dyestuff of the formula:

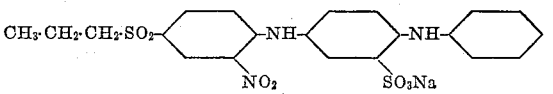

which dyestuff dyes wool from an acid bath yellowish brown shades of excellent fastness properties, especially to washing, ironing, seawater and perspiration.

4. The dyestuff of the formula:

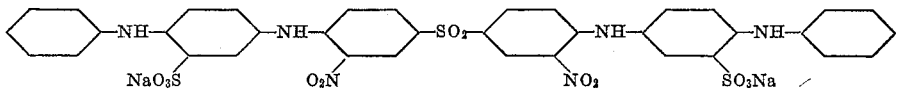

which dyestuff dyes wool from an acid bath yellowish brown shades of good fastness to washing, light and perspiration.

HEINRICH RITTER.